(12) United States Patent
Michaud

(10) Patent No.: US 11,345,836 B2
(45) Date of Patent: May 31, 2022

(54) ADHESIVE DUAL-COMPONENT COMPOSITION BASED ON POLYURETHANE

(71) Applicant: Bostik SA, La Plaine Saint-Denis (FR)

(72) Inventor: Guillaume Michaud, Compiegne (FR)

(73) Assignee: BOSTIK SA, La Plaine Saint-Denis (FR)

( * ) Notice: Subject to any disclaimer, the term of this patent is extended or adjusted under 35 U.S.C. 154(b) by 0 days.

(21) Appl. No.: 16/316,372

(22) PCT Filed: Jul. 11, 2017

(86) PCT No.: PCT/FR2017/051902
§ 371 (c)(1),
(2) Date: Jan. 9, 2019

(87) PCT Pub. No.: WO2018/011518
PCT Pub. Date: Jan. 18, 2018

(65) Prior Publication Data
US 2019/0249049 A1    Aug. 15, 2019

(30) Foreign Application Priority Data

Jul. 12, 2016 (FR) .................................... 16 56653

(51) Int. Cl.
| | |
|---|---|
| *C09J 175/06* | (2006.01) |
| *B32B 7/12* | (2006.01) |
| *C08G 18/75* | (2006.01) |
| *C08G 18/76* | (2006.01) |
| *C08G 18/42* | (2006.01) |
| *B32B 27/34* | (2006.01) |
| *B32B 15/04* | (2006.01) |
| *B32B 27/36* | (2006.01) |
| *B32B 27/08* | (2006.01) |
| *B32B 27/30* | (2006.01) |

(Continued)

(52) U.S. Cl.
CPC ............. *C09J 175/06* (2013.01); *B32B 7/12* (2013.01); *B32B 15/043* (2013.01); *B32B 15/082* (2013.01); *B32B 15/085* (2013.01); *B32B 15/088* (2013.01); *B32B 15/09* (2013.01); *B32B 15/095* (2013.01); *B32B 15/12* (2013.01); *B32B 15/20* (2013.01); *B32B 27/08* (2013.01); *B32B 27/10* (2013.01); *B32B 27/28* (2013.01); *B32B 27/302* (2013.01); *B32B 27/304* (2013.01); *B32B 27/32* (2013.01); *B32B 27/34* (2013.01); *B32B 27/36* (2013.01); *C08G 18/12* (2013.01); *C08G 18/222* (2013.01); *C08G 18/42* (2013.01); *C08G 18/4202* (2013.01); *C08G 18/758* (2013.01); *C08G 18/7642* (2013.01); *C08G 18/792* (2013.01); *C08G 18/8022* (2013.01); *C08G 18/8029* (2013.01); *C09J 5/00* (2013.01); *B32B 2250/02* (2013.01); *B32B 2250/03* (2013.01); *B32B 2255/10* (2013.01); *B32B 2255/26* (2013.01); *B32B 2307/31* (2013.01); *B32B 2307/546* (2013.01); *B32B 2307/71* (2013.01); *B32B 2307/732* (2013.01); *B32B 2439/70* (2013.01); *B32B 2439/80* (2013.01); *B32B 2555/00* (2013.01); *C09J 2475/00* (2013.01)

(58) Field of Classification Search
CPC .... C08G 18/12; C08G 18/42; C08G 18/4202; C08G 18/758; C08G 18/7642; C08G 18/792; C08G 18/8022; C08G 18/8029; B32B 15/043; B32B 15/09; B32B 15/095; B32B 27/36; B32B 7/12; C09J 175/06; C09J 2475/00; C09J 5/00
See application file for complete search history.

(56) References Cited

U.S. PATENT DOCUMENTS

| | | | |
|---|---|---|---|
| 3,915,935 A | | 10/1975 | Abraham et al. |
| 4,389,519 A | * | 6/1983 | Yamazaki .......... C08G 18/7628 528/73 |

(Continued)

FOREIGN PATENT DOCUMENTS

| | | | | |
|---|---|---|---|---|
| EP | 1857480 A1 | | 11/2007 | |
| EP | 3067377 A1 | * | 9/2016 | ............. B32B 37/12 |

(Continued)

OTHER PUBLICATIONS

ISA/EP; International Search Report and Written Opinion for International Application No. PCT/FR2017/051902 dated Jul. 9, 2017, 11 pages.

*Primary Examiner* — Callie E Shosho
*Assistant Examiner* — Krupa Shukla
(74) *Attorney, Agent, or Firm* — NK Patent Law

(57) ABSTRACT

The invention relates to an adhesive dual-component composition based on polyurethane, comprising an —NCO component and an —OH component such that: the —NCO component is a composition comprising A) at least one polyurethane prepolymer comprising at least two NCO terminal groups obtained by polyaddition reaction of at least one aliphatic polyisocyanate selected from aliphatic diisocyanate monomers and mixtures of at least one aliphatic diisocyanate monomer with at least one triisocyanate based on XDI, and at least one polyester diol, and B) at least one triisocyanate based on XDI; and the —OH component is a composition comprising at least one polyester polyol. The invention relates to a method for producing a multilayer structure implementing an adhesive composition according to the invention, as well as to the use of such a structure in the field of flexible packaging.

13 Claims, No Drawings

(51) Int. Cl.
*B32B 27/32* (2006.01)
*B32B 27/10* (2006.01)
*B32B 27/28* (2006.01)
*B32B 15/12* (2006.01)
*C08G 18/80* (2006.01)
*B32B 15/095* (2006.01)
*C08G 18/22* (2006.01)
*B32B 15/20* (2006.01)
*C08G 18/79* (2006.01)
*B32B 15/082* (2006.01)
*B32B 15/085* (2006.01)
*B32B 15/088* (2006.01)
*B32B 15/09* (2006.01)
*C08G 18/12* (2006.01)
*C09J 5/00* (2006.01)

(56) References Cited

U.S. PATENT DOCUMENTS

| | | | | |
|---|---|---|---|---|
| 6,808,811 | B1* | 10/2004 | Sawada | G02B 1/105 |
| | | | | 428/424.8 |
| 2006/0046067 | A1 | 3/2006 | Kleineberg et al. | |
| 2009/0156752 | A1* | 6/2009 | Uchida | C08G 18/348 |
| | | | | 525/403 |
| 2010/0119821 | A1* | 5/2010 | Uemura | C08G 18/10 |
| | | | | 428/355 N |
| 2012/0258306 | A1* | 10/2012 | Kinzelmann | C08G 18/12 |
| | | | | 428/340 |

FOREIGN PATENT DOCUMENTS

FR     3015510 A1    6/2015
WO   2006026670 A1    3/2006

\* cited by examiner

ADHESIVE DUAL-COMPONENT COMPOSITION BASED ON POLYURETHANE

CROSS-REFERENCE TO RELATED APPLICATIONS

This application is a U.S. National Stage application of International Application No. PCT/FR2017/051902, filed on Jul. 11, 2017, which claims the benefit of French Patent Application No. 16 56653, filed Jul. 12, 2016.

FIELD OF THE INVENTION

The present invention relates to a two-component polyurethane-based adhesive composition. The invention also relates to a multilayer structure (or laminate) comprising at least two layers of material bonded together by a layer of the adhesive composition according to the invention. It also relates to a lamination process suitable for the manufacture of said multilayer structure and also to the use of a multilayer structure according to the invention in the field of flexible packaging, in particular for the manufacture of flexible packagings intended for the packaging of foodstuffs, cosmetic products, pharmaceutical products or body hygiene products.

TECHNOLOGICAL BACKGROUND

The flexible packagings intended for the packaging of the most diverse products, such as those manufactured by the food processing, cosmetics or detergents industries, generally consist of several layers (in the form of sheets or films), the thickness of which is between 5 and 150 µm and which consist of different materials, such as paper, a metal (for example aluminum) or also thermoplastic polymers. The corresponding multilayer structure, the thickness of which can vary from 20 to 400 µm, makes it possible to combine the properties of the different individual layers of material and to thus provide the consumer with a combination of characteristics suitable for the final flexible packaging, such as, for example:
  its visual appearance (in particular that of the printed elements presenting the information relating to the packaged product and intended for the consumer),
  a barrier effect to moisture, to gases ($O_2$, $N_2$, $CO_2$ and their mixtures) and/or to light and to ultraviolet (UV) rays,
  contact with food without risk of toxicity or of modification to the organoleptic properties of the packaged foodstuffs,
  chemical resistance for certain products, such as ketchup or liquid soap,
  good behavior at high temperature, for example in the case of pasteurization or sterilization. In particular, the adhesive seal formed by crosslinking of the adhesive layer connecting the individual layers of the packaging has to retain a sufficient level of cohesion after heat treatment, in order to avoid any phenomenon of delamination.

In order to form the final packaging, the laminate is generally shaped by heat sealing at a temperature varying from approximately 120 to 250° C., the latter technique also being used for closing the packaging around the product intended for the consumer.

The various layers of material of which the laminate is composed are combined or assembled by laminating during industrial lamination processes.

These processes employ adhesives and devices (or machines) designed for this purpose. The adhesive composition employed for the purpose of producing the laminate is often described by the term of "lamination adhesive".

These processes first of all comprise a stage of coating the adhesive composition over a first layer of material, which consists of the deposition of a continuous layer of adhesive with a controlled thickness generally of less than 10 µm, corresponding to an amount of adhesive (or grammage) which is also controlled, generally not exceeding 10 g/m². This coating stage is followed by stage of laminating a second layer of material, identical to or different from the first, consisting of the application, under pressure, of this second layer of material to the first layer of material covered with the layer of adhesive.

Two-component polyurethane-based adhesive compositions are commonly used for this type of application.

These compositions are supplied to the laminator in the form of 2 compositions (or components):
  one (known as —NCO component) containing chemical entities carrying isocyanate end groups, and
  the other (known as —OH component) containing chemical entities carrying hydroxyl end groups.

The mixing of these 2 components is carried out under hot conditions at a temperature of between 35 and 80° C. by the operator of the lamination machine, prior to starting it up, and makes possible, by virtue of an appropriate viscosity, the correct operation of the machine.

On conclusion of the coating of the mixture thus obtained and of the laminating operation, the isocyanate groups of the —NCO component react with the hydroxyl groups of the —OH component, according to a reaction referred to as crosslinking, to form a polyurethane which exists in the form of a three-dimensional network comprising urethane groups, providing the cohesion of the adhesive seal between the 2 laminated layers of material.

The multilayer structures obtained after lamination are generally wound off in the form of reels, known as mother reels, which are subsequently generally stored at ambient temperature or in an oven in order to provide sufficient crosslinking of the adhesive layer.

The lamination operation is very often followed by an operation of cutting the composite multilayer structure, which is also carried out by the laminator, so to generate, from a mother reel of said structure, several daughter reels of lower width, for example of between 10 cm and 1 m.

These daughter reels are intended to be transported and delivered to the various client manufacturers of the laminators, who employ them directly on their packaging lines in order to carry out the packaging of their own products, for example processed foodstuffs, cosmetics or detergents, which are intended in particular for the consumer.

The chemical entities present in the —NCO component are generally polymeric chemical compounds carrying isocyanate end groups (often known as prepolymers as they are precursors of the constituent final crosslinked polyurethane of the adhesive seal), which are themselves generally polyurethanes produced by the reaction of a stoichiometric excess of at least one diisocyanate with at least one polyether polyol and/or polyester polyol.

The chemical entities present in the —OH component are generally polymeric or non-polymeric compounds, sometimes of natural origin (such as castor oil), which generally include polymers of polyether polyol and/or polyester polyol type, with a number-average molecular weight Mn (or molar mass) ranging from 400 to 4000 g/mol.

However, these two-component polyurethane-based adhesive compositions generally exhibit the disadvantage of employing an —NCO component comprising high residual contents of diisocyanate monomers originating from the reaction for the synthesis of the polyurethane prepolymer carrying NCO groups (or having NCO endings). This is because these residual diisocyanate monomers are capable of resulting in a number of undesirable effects.

"Diisocyanate monomer" is understood to mean a hydrocarbon compound of low molar mass (of less than 700 g/mol) having two isocyanate groups. In particular, "aromatic diisocyanate monomer" is understood to mean a diisocyanate monomer as defined above, in which one of the NCO groups is connected via a covalent bond to a carbon atom forming part of an aromatic hydrocarbon ring, such as a phenyl group.

The disadvantage of aromatic diisocyanate monomers, such as toluene diisocyanate (TDI) or diphenylmethane diisocyanate (MDI), is that they are capable of migrating through the packaging and of forming, by hydrolysis on contact with water or with moisture present in the foods or other packaged products, primary aromatic amines regarded as toxic.

In order to take into account the undesirable effects related to the presence of these aromatic diisocyanate monomers, regulations require, for some types of products, in particular in the food field, a specific labelling of the product, if the concentration of aromatic diisocyanate monomers exceeds 0.1% by weight of the weight of the product.

One of the solutions envisaged to overcome these disadvantages and meet the abovementioned health requirements was to reduce the residual content of aromatic diisocyanate monomers. However, the processes employed for this purpose are restrictive.

Another solution was to prepare the polyurethane prepolymer having NCO endings from aliphatic diisocyanate monomer, that is to say from nonaromatic diisocyanate monomer and in particular from diisocyanate monomer in which neither of the NCO groups is connected by a covalent bond to a carbon atom forming part of an aromatic hydrocarbon ring, such as a phenyl group. This is because aliphatic diisocyanate monomers do not exhibit the abovementioned disadvantages. However, it is desirable to also limit their content as some of them, such as IPDI, can also present health problems, being classified as sensitizing.

Patent application WO2006/026670 discloses two-component polyurethane-based adhesive compositions comprising, in a first component denoted A, a composition comprising, in solvent, a polyurethane prepolymer obtained by reaction of a mixture of IPDI and of an IPDI triisocyanate isocyanurate with a mixture of a polyester diol 1 and 2 and of bisphenol A propoxylate, with an aminosilane, and, in a second component denoted B, a composition comprising, in solvent, at least one branched polyester polyol and an epoxy resin resulting from bisphenol A and from epichlorohydrin.

However, the two-component adhesive compositions described in this document are not entirely satisfactory and remain to be improved in a number of respects, in particular from the viewpoint of their adhesive performance, of their behavior toward sterilization, of their harmlessness and of their rate of crosslinking.

This is because these compositions crosslink slowly and do not make it possible to rapidly achieve the desired adhesive performance qualities, in particular in the case of the adhesive bonding of metal materials, which requires the operator to place the multilayer structures in an oven at 60° C., in order to reduce the duration of crosslinking to an acceptable level.

In particular, the two-component adhesive compositions described do not make it possible to rapidly manufacture multilayer structures exhibiting a high level of cohesion, as desired in some types of applications or processes.

In particular, when it is desired to transform or treat the multilayer structures obtained, for example by a cutting or heat-sealing operation, followed by an optional pasteurization or sterilization treatment, the operator has to wait for the multilayer structure to exhibit a sufficient level of cohesion before being able to operate, if an imperfect cutting and/or a nonconforming packaging is not to be obtained.

In addition, the multilayer structures described, obtained with the compositions of the prior art, exhibit, after sterilization, signs of degradation of the adhesive seal which are reflected in particular by a significant loss in cohesion of the adhesive seal, above 30%, with respect to its initial value measured before sterilization.

Furthermore, the use of a significant amount of solvent in the adhesive compositions is not very desirable as this results in a low-rate lamination process which is not very compact and which is potentially more dangerous in the case of a flammable and volatile solvent.

Thus, there exists a need to develop a polyurethane-based adhesive composition which does not exhibit the disadvantages of the abovementioned prior art.

The aim of the present invention is to provide a polyurethane-based adhesive composition, substantially, indeed even completely, devoid of aromatic and/or aliphatic diisocyanate monomers, which is suitable for the high-output production of multilayer structures which can be used in the manufacture of flexible packagings.

In particular, the aim is to develop a polyurethane-based adhesive composition which exhibits a satisfactory rate of crosslinking at ambient temperature (23° C.), making it possible to rapidly produce (in less than 5 days) laminates with an excellent degree of cohesion.

In particular, the aim is to develop a polyurethane-based adhesive composition which exhibits a better thermal resistance, in particular which exhibits a better behavior with regard to the pasteurization and/or sterilization test.

In particular, the aim is to develop a polyurethane-based adhesive composition which is suitable for the manufacture of a broad range of multilayer structures, especially those comprising at least one layer of metal material, which structures can be used in the manufacture of flexible packagings.

In particular, the aim is to develop a polyurethane-based adhesive composition which can be employed with a reduced content of solvent (preferably less than 45% by weight of the total weight of the adhesive composition).

In particular, the aim is to develop a polyurethane-based adhesive composition which is simple to prepare by mixing of its components at ambient temperature (23° C.) and easy to employ by a conventional industrial lamination process, without it being necessary to accelerate the crosslinking reaction of the adhesive layer by heating.

It has now been found that the adhesive composition which is a subject matter of the present patent application makes it possible to meet its needs.

In particular, the adhesive composition according to the invention makes it possible to manufacture, with a satisfactory level of cohesion, a multilayer structure suitable for the manufacture of flexible packaging and capable of withstanding a high-temperature heat treatment ranging from 60° C.

to 135° C., such as a pasteurization (70° C. to 99° C.) and better still a sterilization (100° C. to 135° C.).

In particular, the adhesive composition according to the invention makes it possible to manufacture, with an excellent level of cohesion, different types of laminates which can be used in the manufacture of flexible packagings, including those based on metal materials.

In particular, the adhesive composition according to the invention can be employed with a content of solvent of less than or equal to 45% by weight of the weight of the adhesive composition. In particular, the —NCO component used according to the invention can comprise a reduced content of solvent while exhibiting a viscosity satisfactory for being mixed at ambient temperature.

In particular, the adhesive composition according to the invention rapidly crosslinks at ambient temperature after mixing of the —NCO and —OH components and thus makes it possible to produce, with high line speeds, multilayer structures with an excellent level of cohesion.

In particular, the adhesive composition according to the invention satisfies the health requirements required in order to be used to manufacture multilayer structures intended for the packaging of foodstuffs, cosmetic products, pharmaceutical products or body hygiene products.

In particular, the adhesive composition according to the invention exhibits a suitable viscosity at ambient temperature and is sufficiently stable to be employed in conventional industrial lamination processes.

The level of cohesion and the thermal resistance of the adhesive compositions can be evaluated in a way well known to a person skilled in the art, as illustrated in the examples.

SUMMARY OF THE INVENTION

A first subject matter of the invention relates to a two-component polyurethane-based adhesive composition comprising an —NCO component and an —OH component, such that:
the —NCO component is a composition comprising:
A) at least one polyurethane prepolymer comprising at least two NCO end groups obtained by a polyaddition reaction:
of at least one aliphatic polyisocyanate chosen from aliphatic diisocyanate monomers and mixtures of at least one aliphatic diisocyanate monomer with at least one triisocyanate based on XDI, and
of at least one polyester diol,
B) at least one triisocyanate based on XDI, and
the —OH component is a composition comprising at least one polyester polyol.

According to one embodiment, the aliphatic diisocyanate monomer(s) is (are) chosen from:
xylylene diisocyanate (XDI),
aliphatic diisocyanate monomers other than XDI, and their mixtures.

According to one embodiment, the amount of aliphatic diisocyanate monomer(s) with respect to the amount of polyester diol(s) is such that the NCO/OH molar ratio, denoted $r_1$, ranges from 1.0 to 2.2, preferably from 1.2 to 2.0.

This ratio $r_1$ corresponds to the ratio of the number of NCO groups (present in the total amount of aliphatic diisocyanate monomer(s) used to synthesize the polyurethane prepolymer having NCO endings) to the number of OH groups (present in the total amount of diol(s) used to synthesize the polyurethane prepolymer having NCO endings).

According to one embodiment, the aliphatic diisocyanate monomer used to prepare the polyurethane prepolymer having NCO endings is a mixture of aliphatic diisocyanate monomers comprising at least XDI, preferably at least 50% by weight of XDI with respect to the weight of said mixture, it being possible for the latter to be in the form of a pure XDI isomer or in the form of a mixture of XDI isomers.

According to a preferred embodiment, the aliphatic diisocyanate monomer used to prepare the polyurethane prepolymer having NCO endings is XDI, it being possible for the latter to be in the form of a pure isomer, such as meta-xylylene diisocyanate (m-XDI), or in the form of a mixture of XDI isomers.

According to one embodiment, the molar ratio of the number of NCO groups present in the total amount of aliphatic diisocyanate monomer(s) used to synthesize the polyurethane prepolymer having NCO endings A) to the number of NCO groups present in the total amount of triisocyanate(s) based on XDI, denoted $r_2$, ranges from 3 to 11, preferably from 5 to 11.

According to one embodiment, the polyaddition reaction takes place in the presence or absence of at least one reaction catalyst, at a reaction temperature T1 of less than 95° C. and preferably ranging from 65° C. to 80° C., under anhydrous conditions.

According to a preferred embodiment, the triisocyanate(s) based on XDI is (are) chosen from XDI isocyanurates, XDI biurets, adducts of XDI and of triols, and their mixtures.

According to one embodiment, the —NCO component comprises a content of aliphatic diisocyanate monomer(s) of less than or equal to 0.5% by weight, with respect to the weight of the —NCO component.

According to one embodiment, the polyester diol(s) and/or polyester polyol(s) has (have) a number-average molar mass ranging from 1000 to 4000 g/mol.

According to one embodiment, the —NCO and —OH components, which are intended to be mixed, are present in the two-component adhesive composition according to the invention in amounts such that the NCO/OH molar ratio, denoted $r_3$, ranges from 2 to 15, more preferably from 6 to 11.

This ratio $r_3$ corresponds to the ratio of the number of NCO groups present in the total amount of NCO component intended to be mixed to the number of OH groups present in the total amount of OH component intended to be mixed.

Another subject matter of the invention is a multilayer structure comprising at least two layers of material bonded together by an adhesive layer, characterized in that said adhesive layer consists of the adhesive composition according to the invention in the crosslinked state.

According to one embodiment, the multilayer structure according to the invention comprises at least one layer of aluminum-based material.

Another subject matter of the invention is a process for the manufacture of a multilayer structure according to the invention, comprising the following stages:
(i) the mixing of the —NCO and —OH components of the two-component adhesive composition according to the invention, then
(ii) the coating of said mixture over the surface of a first layer of material, then
(iii) the laminating of the surface of a second layer of material over said coated surface, then
(iv) the crosslinking of said mixture.

According to one embodiment of the manufacturing process, the mixing of the —NCO component and of the —OH component comprises at least one solvent and the process additionally comprises a stage of evaporation of the solvent or solvents.

Another subject matter of the invention is the use of a multilayer structure according to the invention in the manufacture of flexible packagings and in particular of heat-sealable, sterilizable and/or pasteurizable flexible packagings.

Other subject matters and characteristics of the present invention will become more clearly apparent on reading the description and the examples.

DETAILED DESCRIPTION OF THE EMBODIMENTS OF THE INVENTION

In the present patent application, unless otherwise indicated:
- the amounts expressed in the percentage form correspond to weight/weight percentages;
- the number-average molecular weights (Mn), expressed in grams per mole (g/mol), are determined by calculation by the analysis of the content of (NCO or OH) end groups, expressed in milliequivalents per gram (meq/g), and the functionality (number of NCO or OH groups per mole) of the entity under consideration (polyurethane prepolymer having NCO endings, polyester diol or polyester polyol);
- the hydroxyl number of a polyester polyol (denoted OHN) represents the number of hydroxyl functional groups per gram of polyester polyol and is expressed in the text of the present patent application in the form of the equivalent number of milligrams of potassium hydroxide (KOH) which are used in the quantitative determination of the hydroxyl functional groups. The OHN can be measured experimentally, for example according to the standard ISO 14900:2001. In the case of a mixture of polyester polyols, the OHN can also be calculated from the known OHN values of each of the polyester polyols and from their respective contents by weight in said mixture.
- the content of diisocyanate monomer is measured according to the following analytical method, which is based on the specific reaction of the isocyanate NCO group with an amine (1-(2-methoxyphenyl)piperazine or PPZ) to form stable urea derivatives. These derivatives are obtained during the preparation of the adhesive sample by dilution/dissolution of this sample using a 0.02 mol/l solution of PPZ in acetonitrile. The PZZ derivatives formed from the isocyanates present in the sample to be analyzed are subsequently quantitatively determined by a reversed-phase C18 High Performance Liquid Chromatography (HPLC) system with a mobile phase gradient comprising a mixture of water and acetonitrile buffered using a 0.2% by weight aqueous tetrabutylammonium bisulfate solution, at a pH ranging from 2 to 3, provided with an Ultra-Violet (UV) detector operating at 254 nm. These compounds are identified and quantified by comparing their retention times and their surface areas of chromatographic peaks with those of the standard PPZ derivatives obtained by reaction of a diisocyanate monomer of known nature and concentration.
- the viscosity can be measured using a Brookfield viscometer.

the various embodiments described in the present patent application can be combined with one another.

Two-Component Adhesive Composition

The present invention relates to a two-component polyurethane-based adhesive composition comprising an —NCO component and an —OH component, such that:
the —NCO component is a composition comprising:
A) at least one polyurethane prepolymer comprising at least two NCO end groups obtained by a polyaddition reaction:
  of at least one aliphatic polyisocyanate chosen from aliphatic diisocyanate monomers and their mixture with at least one triisocyanate based on XDI, and
  of at least one polyester diol,
B) at least one triisocyanate based on XDI, and
the —OH component is a composition comprising at least one polyester polyol.

—NCO Component

The —NCO component comprises at least one polyurethane prepolymer having NCO endings A) obtained by a polyaddition reaction:
of at least one aliphatic polyisocyanate chosen from aliphatic diisocyanate monomers and their mixture with at least one triisocyanate based on XDI, and
of at least one polyester diol.

The aliphatic diisocyanate monomer(s) which can be used to prepare the polyurethane prepolymer having NCO endings A) used according to the invention can be chosen from the following diisocyanates, and their mixture:
Hexamethylene diisocyanate (HDI),
Heptane diisocyanate,
Octane diisocyanate,
Nonane diisocyanate,
Decane diisocyanate,
Undecane diisocyanate,
Dodecane diisocyanate,
HDI allophanate, as defined in the patent application FR 3 015 510, incorporated by reference in the present patent application,
Methylenebis(4-cyclohexyl isocyanate) (HMDI),
Isophorone diisocyanate (IPDI),
Norbornane diisocyanate,
Norbornene diisocyanate,
1,4-Cyclohexane diisocyanate (CHDI),
Methylcyclohexane diisocyanate,
Ethylcyclohexane diisocyanate,
Propylcyclohexane diisocyanate,
Methyldiethylcyclohexane diisocyanate,
Cyclohexanedimethylene diisocyanate,
1,5-Diisocyanato-2-methylpentane (MPDI),
1,6-Diisocyanato-2,4,4-trimethylhexane,
1,6-Diisocyanato-2,2,4-trimethylhexane (TMDI),
4-Isocyanatomethyl-1,8-octane diisocyanate (TIN),
2,5-Bis(isocyanatomethyl)bicyclo[2.2.1]heptane (2,5-NBDI),
2,6-Bis(isocyanatomethyl)bicyclo[2.2.1]heptane (2,6-NBDI),
1,3-Bis(isocyanatomethyl)cyclohexane (1,3-H6-XDI),
1,4-Bis(isocyanatomethyl)cyclohexane (1,4-H6-XDI),
Xylylene diisocyanate (XDI), in particular m-xylylene diisocyanate (m-XDI).

The aliphatic diisocyanate monomer(s) which can be used to prepare the polyurethane prepolymer having NCO endings A) used according to the invention can be chosen from the following diisocyanates, and their mixture:
Hexamethylene diisocyanate (HDI),
Heptane diisocyanate,
Octane diisocyanate,
Nonane diisocyanate,
Decane diisocyanate,
Undecane diisocyanate,
Dodecane diisocyanate,
HDI allophanate, as defined in the patent application FR 3 015 510, incorporated by reference in the present patent application,
Methylenebis(4-cyclohexyl isocyanate) (HMDI),
Isophorone diisocyanate (IPDI),
Norbornane diisocyanate,
Norbornene diisocyanate,
1,4-Cyclohexane diisocyanate (CHDI),
Methylcyclohexane diisocyanate,
Ethylcyclohexane diisocyanate,
Propylcyclohexane diisocyanate,
Methyldiethylcyclohexane diisocyanate,
Cyclohexanedimethylene diisocyanate,
1,5-Diisocyanato-2-methylpentane (MPDI),
1,6-Diisocyanato-2,4,4-trimethylhexane,
1,6-Diisocyanato-2,2,4-trimethylhexane (TMDI),
4-Isocyanatomethyl-1,8-octane diisocyanate (TIN),
2,5-Bis(isocyanatomethyl)bicyclo[2.2.1]heptane (2,5-NBDI),
2,6-Bis(isocyanatomethyl)bicyclo[2.2.1]heptane (2,6-NBDI),
1,3-Bis(isocyanatomethyl)cyclohexane (1,3-H6-XDI),
1,4-Bis(isocyanatomethyl)cyclohexane (1,4-H6-XDI).

Preferably, the aliphatic diisocyanate monomer(s) which can be used to prepare the polyurethane prepolymer having NCO endings A) used according to the invention can be chosen from the following diisocyanates, and their mixture:
HDI allophanate, as defined in the patent application FR 3 015 510, incorporated by reference in the present patent application,
Methylenebis(4-cyclohexyl isocyanate) (HMDI),
Isophorone diisocyanate (IPDI),
1,5-Diisocyanato-2-methylpentane (MPDI),
1,3-Bis(isocyanatomethyl)cyclohexane (1,3-H6-XDI),
1,4-Bis(isocyanatomethyl)cyclohexane (1,4-H6-XDI),
xylylene diisocyanate (XDI), in particular m-xylylene diisocyanate (m-XDI).

According to one embodiment, the aliphatic diisocyanate monomer(s) used to prepare the polyurethane prepolymer having NCO endings is (are) chosen from xylylene diisocyanate (XDI) and/or aliphatic diisocyanate monomers other than XDI, such as isophorone diisocyanate (IPDI).

According to one embodiment, the aliphatic diisocyanate monomer(s) used to prepare the polyurethane prepolymer having NCO endings is (are) chosen from xylylene diisocyanate (XDI) and/or aliphatic diisocyanate monomers other than XDI, such as, for example, those mentioned above, in particular isophorone diisocyanate (IPDI) or methylenebis (4-cyclohexyl isocyanate) (HMDI).

According to one embodiment, the aliphatic diisocyanate monomer(s) used to prepare the polyurethane prepolymer having NCO endings is (are) chosen from methylenebis(4-cyclohexyl isocyanate) (HMDI) and/or aliphatic diisocyanate monomers other than HMDI, such as, for example, those mentioned above, in particular isophorone diisocyanate (IPDI).

According to one embodiment, the aliphatic diisocyanate monomer used to prepare the polyurethane prepolymer having NCO endings is a mixture of aliphatic diisocyanate monomers comprising from 0% to 100% by weight of XDI, preferably at least 50% by weight of XDI, with respect to the weight of said mixture, it being possible for said XDI to be in the form of a pure XDI isomer (such as, for example, meta-xylylene diisocyanate) or in the form of a mixture of XDI isomers.

According to a preferred embodiment, the aliphatic diisocyanate monomer used to prepare the polyurethane prepolymer having NCO endings is XDI, it being possible for the latter to be in the form of a pure isomer, such as meta-xylylene diisocyanate (m-XDI), or in the form of a mixture of XDI isomers.

According to a preferred embodiment, the aliphatic diisocyanate monomer used to prepare the polyurethane prepolymer having NCO endings is methylenebis(4-cyclohexyl isocyanate) (HMDI).

In particular, the aliphatic diisocyanate monomer(s) can be used in the form of a composition of aliphatic diisocyanates comprising at least 90% by weight and preferably at least 95% by weight, with respect to the weight of said composition, of an aliphatic diisocyanate monomer.

The aliphatic diisocyanate monomer(s) which can be used to prepare the polyurethane prepolymer having NCO endings A) used according to the invention is (are) commercially available.

The polyester diol(s) which can be used to prepare the polyurethane prepolymer having NCO endings A) used according to the invention can be chosen from those, the number-average molecular weight Mn of which is less than or equal to 4000 g/mol, preferably from those, the number-average molecular weight Mn of which ranges from 1000 to 4000 g/mol.

Preferably, the polyester diol(s) which can be used to prepare the polyurethane prepolymer having NCO endings A) used according to the invention exhibit(s) a hydroxyl number (OHN) ranging from 28 to 112 mg KOH/g, preferably ranging from 28 to 90 mg KOH/g, preferentially ranging from 30 to 85 mg KOH/g, advantageously ranging from 34 to 85 mg KOH/g.

The polyester diol(s) which can be used to prepare the polyurethane prepolymer having NCO endings A) used according to the invention can be chosen from:
polyester diols resulting from the polycondensation of at least one dicarboxylic acid, or of at least one of its corresponding anhydrides or diesters, with at least one diol,
polyester diols resulting from a polymerization with ring opening of at least one cyclic lactone with at least diol, such as polycaprolactone polyols.

The dicarboxylic acid(s) which can be used for the synthesis of the abovementioned polyester diols are linear or branched, cyclic or acyclic, saturated or unsaturated and aromatic or aliphatic and preferably comprise from 3 to 40 carbon atoms and more preferably from 6 to 10 carbon atoms.

The diol(s) which can be used for the synthesis of the abovementioned polyester diols can be chosen from polyalkylene diols, polyoxyalkylene diols and the mixtures of these compounds, the alkylene (saturated) part of these compounds preferably being linear or branched and preferably comprising from 2 to 40 carbon atoms and more preferably from 2 to 8 carbon atoms.

The cyclic lactone(s) which can be used for the synthesis of the abovementioned polyester diols preferably comprise from 3 to 7 carbon atoms.

According to one embodiment, use is made of a mixture of at least two, and preferably of two, polyester diol(s) to prepare the polyurethane prepolymer having NCO endings A) used according to the invention.

The polyester diol(s) which can be used to prepare the polyurethane prepolymer having NCO endings A) used according to the invention can be prepared in a conventional manner and/or is (are) widely available commercially, as illustrated in the examples.

The polyester diol(s) which can be used to prepare the polyurethane prepolymer having NCO endings A) used according to the invention can be used as polyester polyol(s) which can be used in the —OH component.

The triisocyanate(s) based on XDI which can be used to prepare the polyurethane prepolymer having NCO endings A) used according to the invention or participating in the composition of the —NCO component is (are) preferably chosen from XDI isocyanurates, XDI biurets, adducts of XDI and of triols, and their mixtures.

In particular, the XDI isocyanurate(s) can be used in the form of a composition of XDI (poly)isocyanurate(s) comprising at least 70% by weight of XDI isocyanurate(s), with respect to the weight of said composition.

Preferably, the diisocyanate isocyanurate(s) which can be used according to the invention correspond(s) to the following general formula (I):

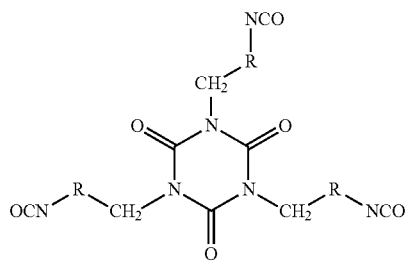

in which R represents:
the divalent radical derived from xylylene diisocyanate (such as m-XDI):

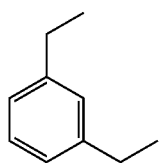

Mention may be made, by way of triols which can be used to prepare the adducts of XDI and triol, for example, of Glycerol, Trimethylolmethane (TMM), Trimethylolethane (TME) and Trimethylolpropane (TMP). Preferably, TMP is used.

Mention may be made, by way of example of adducts of XDI and of triols which can be used according to the invention, of the adduct of meta-xylylene diisocyanate and of trimethylolpropane, as represented below.

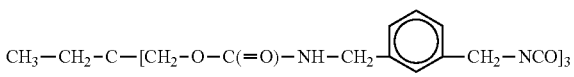

When the polyurethane prepolymer having NCO endings A) is obtained, inter alia, from triisocyanate(s) based on XDI as envisaged above, the latter is (are) preferably identical to the triisocyanate(s) based on XDI B) participating in the composition of the —NCO component.

Preferably, just one triisocyanate based on XDI is used to prepare the polyurethane prepolymer having NCO endings A).

The triisocyanate(s) based on XDI which can be used according to the invention is (are) commercially available.

The polyurethane prepolymer comprising at least two NCO end groups A) is preferably obtained by a polyaddition reaction of at least one aliphatic diisocyanate monomer and of at least one polyester diol, in the presence or absence of at least triisocyanate based on XDI, the amount of aliphatic diisocyanate monomer being in stoichiometric excess, with respect to the amount of polyester diol(s).

Preferably, the amounts of aliphatic diisocyanate monomer(s) and of polyester diol(s) used in the synthesis of the polyurethane prepolymer having NCO endings A) are such that the NCO/OH molar ratio, denoted $r_1$, ranges from 1.0 to 2.2, preferably from 1.2 to 2.0.

The amounts by weight of aliphatic diisocyanate monomer(s) and of polyester diol(s) to be charged to the reactor are determined on the basis of this ratio and also the hydroxyl number OHN of the polyester diol or mixture of polyester diols, measured experimentally or calculated from the OHN values of the polyester diols present and from their respective contents by weight in said mixture.

According to a preferred embodiment, the polyurethane prepolymer comprising at least two NCO end groups A) is obtained by a polyaddition reaction of at least one aliphatic diisocyanate monomer and of at least one polyester diol, in the presence of at least one triisocyanate based on XDI, the amount of aliphatic diisocyanate monomer being in stoichiometric excess, with respect to the amount of polyester diol(s).

According to a first alternative form of this embodiment, at least one aliphatic diisocyanate monomer is reacted with at least one polyester diol and then said mixture is reacted with at least one triisocyanate based on XDI.

According to a second alternative form of this embodiment, when the polyurethane prepolymer comprising at least two NCO end groups A) is obtained from several polyester diols, at least one aliphatic diisocyanate monomer is reacted with at least one first polyester diol, then said mixture is reacted with at least one triisocyanate based on XDI and then the mixture obtained can be reacted with at least one second polyester diol, identical to or different from the first polyester diol(s).

The amounts of aliphatic diisocyanate monomer(s) used in the synthesis of the polyurethane prepolymer having NCO endings A) and of triisocyanate(s) based on XDI are such that the ratio $r_2$ preferably ranges from 3 to 11, preferably from 5 to 11.

This ratio $r_2$ corresponds to the ratio of the number of NCO groups present in the total amount of diisocyanate monomer(s) used in the synthesis of the polyurethane prepolymer having NCO endings A) to the number of NCO groups present in the total amount of triisocyanate(s) present in the —NCO component and optionally used in the synthesis of the polyurethane prepolymer having NCO endings A).

The polyurethane prepolymer having NCO endings A) as defined above can be prepared in the presence or absence of at least one reaction catalyst, at a reaction temperature T1 of less than 95° C. and preferably ranging from 65° C. to 80° C., under anhydrous conditions.

The polyurethane prepolymer having NCO endings A) as defined above can be prepared in the presence of organic solvent.

The —NCO component can additionally comprise at least one organic solvent, preferably in an amount ranging from 5% to 55% by weight, more preferably ranging from 15% to 45% by weight, with respect to the total weight of the —NCO component.

The organic solvent can be chosen from ethyl acetate, n-butyl acetate, methyl ethyl ketone, xylylene, tetrahydrofuran, methyltetrahydrofuran or also from Isane® (based on isoparaffins, available from Total) or Exxol® D80 (based on aliphatic hydrocarbons, available from ExxonMobil Chemical).

According to one embodiment, the —NCO component has a viscosity, measured at ambient temperature (23° C.), ranging from 500 to 5000 mPa·s, preferably ranging from 600 to 2000 mPa·s.

The —NCO component obtained can comprise a content of aliphatic diisocyanate monomer(s) of less than or equal to 0.5% by weight, with respect to the weight of the —NCO component.

The content of NCO groups in the —NCO component preferably ranges from 40 to 125 milliequivalents of NCO groups per 100 grams (denoted meq NCO/100 g) of solids content of —NCO component, preferably from 60 to 100 meq NCO/100 g of solids content of —NCO component.

The —NCO component can be prepared by simple mixing of its ingredients or, according to a preferred embodiment, by a preparation process comprising:
  in a first stage S1, the mixing of at least one aliphatic diisocyanate monomer and of at least one polyester diol, then
  in a second stage S2, the introduction of at least one triisocyanate based on XDI into the mixture of the first stage,
  the amount of aliphatic diisocyanate monomer being in stoichiometric excess, with respect to the amount of polyester diol(s),
  preferably, the amounts of aliphatic diisocyanate monomer(s) used in the synthesis of the polyurethane prepolymer having NCO endings A) and of triisocyanate(s) based on XDI being such that the ratio of the number of NCO groups present in the total amount of aliphatic diisocyanate monomer(s) used to the number of NCO groups present in the total amount of triisocyanate(s) based on XDI, denoted $r_2$, ranges from 3 to 11, more preferably from 5 to 11,
  preferably in the presence of at least one reaction catalyst and of at least one solvent, at a reaction temperature T1 of less than 95° C. and more preferably ranging from 65° C. to 80° C., under anhydrous conditions.

The introduction of triisocyanate based on XDI after obtaining a polyurethane prepolymer having NCO endings in stage S1 advantageously makes it possible to obtain an —NCO component substantially devoid of residual aliphatic diisocyanate monomer and with a low viscosity at ambient temperature.

When the polyurethane prepolymer comprising at least two NCO end groups A) is prepared from several polyester diols, at least one polyester diol can be introduced in stage S1 and at least one polyester diol can be introduced subsequently, for example in a third stage S3, following the introduction of the triisocyanate (triisocyanates) based on XDI into the mixture.

According to a preferred embodiment, the —NCO component is a composition comprising:
  A) at least one polyurethane prepolymer comprising at least two NCO end groups obtained by a polyaddition reaction:
    of at least one diisocyanate monomer chosen from the group consisting of the following diisocyanates:
      Hexamethylene diisocyanate (HDI),
      Heptane diisocyanate,
      Octane diisocyanate,
      Nonane diisocyanate,
      Decane diisocyanate,
      Undecane diisocyanate,
      Dodecane diisocyanate,
      HDI allophanate, as defined in the patent application FR 3 015 510, incorporated by reference in the present patent application,
      Methylenebis(4-cyclohexyl isocyanate) (HMDI),
      Isophorone diisocyanate (IPDI),
      Norbornane diisocyanate,
      Norbornene diisocyanate,
      1,4-Cyclohexane diisocyanate (CHDI),
      Methylcyclohexane diisocyanate,
      Ethylcyclohexane diisocyanate,
      Propylcyclohexane diisocyanate,
      Methyldiethylcyclohexane diisocyanate,
      Cyclohexanedimethylene diisocyanate,
      1,5-Diisocyanato-2-methylpentane (MPDI),
      1,6-Diisocyanato-2,4,4-trimethylhexane,
      1,6-Diisocyanato-2,2,4-trimethylhexane (TMDI),
      4-Isocyanatomethyl-1,8-octane diisocyanate (TIN),
      2,5-Bis(isocyanatomethyl)bicyclo[2.2.1]heptane (2,5-NBDI),
      2,6-Bis(isocyanatomethyl)bicyclo[2.2.1]heptane (2,6-NBDI),
      1,3-Bis(isocyanatomethyl)cyclohexane (1,3-H6-XDI),
      1,4-Bis(isocyanatomethyl)cyclohexane (1,4-H6-XDI),
      Xylylene diisocyanate, in particular m-xylylene diisocyanate, and
      their mixtures;
    said diisocyanate monomer preferably being xylylene diisocyanate or methylenebis(4-cyclohexyl isocyanate) (HMDI),
    of at least one polyester diol, preferably of two polyesters diols, having a hydroxyl number (OHN) ranging from 28 to 112 mg KOH/g, preferably ranging from 28 to 90 mg KOH/g, preferentially ranging from 30 to 85 mg KOH/g, advantageously ranging from 34 to 85 mg KOH/g;
  B) at least one triisocyanate based on XDI chosen from adducts of XDI and of triols, such as, for example, the adduct of meta-xylylene diisocyanate and of trimethylolpropane having the following formula:

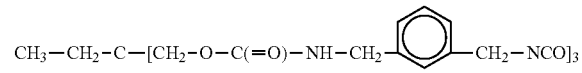

—OH Component

The polyester polyol(s) used according to the invention can represent from 50% to 100% by weight of the weight of the —OH component, preferably from 60% to 90% by weight of the weight of the —OH component.

Use may be made, as polyester polyols which can be used in the —OH component, of any polyester polyol normally used in the field of two-component lamination adhesives.

Preferably, the polyester polyol(s) which can be used in the —OH component exhibit(s) a hydroxyl number (OHN) ranging from 28 to 112 mg KOH/g, preferably ranging from 28 to 90 mg KOH/g, preferentially ranging from 30 to 85 mg KOH/g, advantageously ranging from 34 to 85 mg KOH/g.

Preferably, the polyester polyol(s) which can be used in the —OH component is (are) linear or branched and saturated or unsaturated.

Preferably, the polyester polyol(s) which can be used in the —OH component is (are) preferably chosen from polyester diols and their mixtures.

More preferably, the polyester polyol(s) is (are) chosen from the polyester diols used to prepare the polyurethane prepolymer having NCO endings A) and the mixtures of polyester diol(s) comprising at least one polyester diol used to prepare the polyurethane prepolymer having NCO endings A).

Preferably, the —OH component is a composition comprising a mixture of polyester diols, said polyester diols each having a hydroxyl number (OHN) ranging from 28 to 112 mg KOH/g, preferably ranging from 28 to 90 mg KOH/g, preferentially ranging from 30 to 85 mg KOH/g, advantageously ranging from 34 to 85 mg KOH/g.

Preferably, the amount of polyester polyol(s) used in the —OH component is such that the content of OH groups ranges from 70 to 100 milliequivalents of OH groups per 100 grams (denoted meq KOH/g) of solids content of —OH component and preferably from 80 to 90 meq OH/100 g of solids content of —OH component.

Preferably, the —NCO and —OH components are mixed in amounts such that the ratio $r_3$ ranges from 2 to 15, more preferably from 6 to 11.

Preferably, the mixture of the —NCO and —OH components is such that it makes it possible to obtain a composition exhibiting a viscosity suitable for the use thereof in a conventional lamination process.

The two-component adhesive composition according to the invention can additionally comprise at least one adhesion promoter preferably chosen from silanes, aminosilanes, acryloylsilanes and their mixtures. The adhesion promoter or promoters can be present in the —NCO component and/or in the —OH component, preferably in the —NCO component.

The use of adhesion promoter confers, on the adhesive, a better resistance to hot delamination of particular use when it is desired to manufacture laminates which have to undergo a pasteurization or sterilization treatment.

The total concentration of adhesion promoter in the two-component adhesive composition according to the invention preferably ranges from 0.1% to 2% by weight and more preferably from 0.5% to 1.5% by weight, with respect to the total weight of the adhesive composition.

Multilayer Structure

The adhesive composition according to the invention can be used to manufacture a multilayer structure as described below. Thus, another subject matter of the invention is a multilayer structure comprising at least two layers of material bonded together by an adhesive layer, characterized in that said adhesive layer consists of an adhesive composition according to the invention in the crosslinked state.

The adhesive layer is obtained by crosslinking the adhesive composition (or adhesive mixture) obtained by mixing the —NCO and —OH components, in a proportion of an amount preferably of less than or equal to 5 g/m$^2$, more preferably ranging from 1.4 to 4.5 g/m$^2$ and better still ranging from 2 to 4 g/m$^2$.

The layers of material surrounding the adhesive layer generally consist of one or more materials normally used to manufacture flexible packagings.

Mention may be made, as materials which can be used, of paper, a metal, such as, for example, aluminum, and thermoplastic polymers, it being possible for the latter furthermore to be metallized or coated with specific substance(s) (for example based on silicon oxide or on aluminum oxide) in order to confer additional properties (for example of barrier to moisture, to gases ($O_2$, $N_2$, $CO_2$ and their mixtures) and/or to light and to ultraviolet (UV) rays) on the thermoplastic polymer.

Mention may be made, as thermoplastic polymers which can be used, for example, of:
  polyethylene (PE),
  polypropylene (PP),
  a copolymer based on ethylene and propylene,
  oriented or nonoriented polyamide (PA),
  polyethylene terephthalate (PET), or else
  a copolymer based on ethylene, such as, for example, a
    maleic anhydride-grafted copolymer, a copolymer of
    ethylene and of vinyl acetate (EVA), a copolymer of
    ethylene and of vinyl alcohol (EVOH) or a copolymer
    of ethylene and of an alkyl acrylate, such as methyl
    acrylate (EMA) or butyl acrylate (EBA),
  polystyrene (PS),
  polyvinyl chloride (PVC),
  polyvinylidene chloride (PVDC),
  polyvinylidene fluoride (PVDF),
  a polymer or copolymer of lactic acid (PLA) or
  a polyhydroxyalkanoate (PHA).

The PET or PP films can in particular be metallized (with aluminum). The preparation of these metallized films of thermoplastic polymer is well known to a person skilled in the art and makes it possible to homogeneously coat at least one of the surfaces of said film with a layer of metal (aluminum) particles, generally with a thickness of a few nanometers.

The layers of material surrounding the adhesive layer can additionally comprise one or more additives in order to confer additional properties on them. Mention may be made, as additives which can be used, for example, of slip agents and antifogging agents.

According to a preferred embodiment, the invention relates to a multilayer structure comprising at least two layers of material bonded together by at least one adhesive layer, characterized in that:
  said adhesive layer consists of an adhesive composition according to the invention obtained after mixing its components in the crosslinked state, in a proportion of an amount of less than 5 g/m$^2$, and
  said layers of material preferably consisting of one or more materials chosen, independently of one another, from oriented polyamide (OPA), PE, PP, PET, metallized PET and aluminum.

After crosslinking, the adhesive seal (consisting of the crosslinked layer of adhesive) provides a satisfactory level of cohesion between the two layers of material, which is advantageously maintained after brief or prolonged exposure of said adhesive seal to elevated temperature, which makes it possible to manufacture, on the one hand, heat-sealable multilayer structures, that is to say structures which can in particular be subjected to a temperature of greater than or equal to 200° C. for approximately one second, and, on the other hand, sterilizable or pasteurizable multilayer structures, that is to say structures which can be exposed to temperatures ranging from 100° C. to 135° C., or also ranging from 70° C. to less than 100° C. (for example from 70° C. to 99° C.), respectively, for a period of time sufficient to ensure the sterilization or the pasteurization of the multilayer structure and, if appropriate, of the contents packaged in said structure. This period of time can vary to a large extent according to the nature of the contents packaged (for example food). Preferably, this period of time is at least 15 minutes. More preferably, this period of time ranges from 15 minutes to 2 hours.

According to a more preferred embodiment, the invention relates to a multilayer structure comprising a first layer of metal material and a second layer of material identical to or different from the first, which layers are bonded together at the metal surface of said layer of metal material by at least one adhesive layer, characterized in that:

said adhesive layer consists of an adhesive composition according to the invention obtained after mixing its components in the crosslinked state, in a proportion of an amount of less than 5 g/m$^2$.

The layer of metal material can be a sheet of aluminum or a film made of thermoplastic polymer metallized over at least one of its surfaces and preferably over just one surface (with aluminum).

The thickness of each of the two layers of material adjacent to the adhesive layer and of the other layers optionally employed in the multilayer structure according to the invention is capable of varying within a wide range extending from 5 to 150 μm. The total thickness of the multilayer structure is capable of also varying within a wide range extending from 20 to 400 μm.

Preferably, the multilayer structure is provided in the form of a multilayer film.

Process for the Manufacture of a Multilayer Structure

Another subject matter of the invention is a process for the manufacture of a multilayer structure according to the invention, comprising the following stages:

(i) the mixing of the —NCO and —OH components of the two-component adhesive composition according to the invention, preferably at ambient temperature, then (ii) the coating of said mixture over the surface of a first layer of material, then (iii) the laminating of the surface of a second layer of material over said coated surface, then (iv) the crosslinking of said mixture, preferably at ambient temperature.

Preferably, the —NCO and —OH components are mixed in amounts such that the ratio $r_3$ ranges from 2 to 15, more preferably from 6 to 11.

The coating of said mixture can be carried out over all or part of the surface of a material.

Preferably, the adhesive mixture is coated in a proportion of an amount preferably of less than or equal to 5 g/m$^2$, more preferably ranging from 1.4 to 4.5 g/m$^2$ and better still ranging from 2 to 4 g/m$^2$.

In particular, the coating of said mixture can be carried out in the form of a layer with a thickness ranging from 1.5 to 5 μm. The coating is preferably carried out continuously or substantially continuously.

The coating and the laminating of the second material are generally carried out within a time interval compatible with the coating process, as is well known to a person skilled in the art, that is to say before the adhesive layer loses its ability to fix the two materials by adhesive bonding.

Optionally, the crosslinking of the adhesive mixture on the surface of the material can be accelerated by heating the laminate at a temperature of less than or equal to 40° C. This can be carried out by placing the laminate in a climate-controlled chamber maintained at a temperature of 40° C. and a relative humidity of 50%. The time necessary for the complete crosslinking of the adhesive layer of the laminate is generally less than 5 days, counting from the manufacture of said laminate.

Use of a Multilayer Structure

Another subject matter of the invention is the use of a multilayer structure according to the invention in the manufacture of flexible packagings and in particular of heat-sealable, sterilizable and/or pasteurizable flexible packagings.

This is because the laminates according to the invention can be heat-treated without substantial loss of the level of cohesion between the layers of material bonded by an adhesive layer according to the invention.

The invention is now described in the following exemplary embodiments which are given purely by way of illustration and should not be interpreted in order to limit the scope thereof.

Examples 1, 2 and 3

The following ingredients were used:

Takenate™ 500, sold by Mitsui Chemical: meta-xylylene diisocyanate (m-XDI) assaying on average at 44.7% by weight of NCO group, with respect to the weight of m-XDI, Desmodur® W, sold by Covestro: methylenebis(4-cyclohexyl isocyanate) (HMDI), assaying on average at 31.8% by weight of NCO group, with respect to the weight of HMDI, Vestanat® IPDI, sold by Evonik: isophorone diisocyanate (IPDI) assaying on average at 37.6% by weight of NCO group, with respect to the weight of IPDI, Dekatol® 105, manufactured by Bostik, corresponding to a polyester diol with a hydroxyl number equal to approximately 85 mg KOH/g, Dekatol® 1105, manufactured by Bostik, corresponding to a polyester diol with a hydroxyl number equal to approximately 97.5 mg KOH/g, EPS® 74/1, sold by Bostik, corresponding to a polyester diol with a hydroxyl number equal to approximately 34.9 mg KOH/g, diluted to 63% by weight in ethyl acetate, Tyzor Pita®, sold by Dorf Ketal and corresponding to a catalyst based on titanium ethyl acetoacetate, Takenate® D-110N, sold by Mitsui Chemical: adduct of m-XDI and of trimethylolpropane corresponding to a triisocyanate based on XDI assaying on average at 15.3% by weight of NCO group, with respect to the weight of said triisocyanate, diluted to 75% by weight in ethyl acetate, Vestanat® T1890/100, sold by Evonik, corresponding to an IPDI triisocyanate isocyanurate assaying on average at 17.3% by weight of NCO group, with respect to the weight of said commercial product, ethyl acetate used as organic solvent, Silquest® A1110, sold by Momentive, corresponding to an adhesion promoter of (3-aminopropyl)trimethoxysilane type.

1.1. —NCO Component

The NCO components of examples 1, 2 and 3 were prepared using the different ingredients above in the proportions shown in table 1. The contents appearing in this table are expressed as % by weight, with respect to the weight of —NCO component.

Preparation of the —NCO Component of Example 1 According to the Invention 256.35 g of Dekatol® 105 are introduced into a reactor provided with a reflux condenser and heating is carried out to 50° C. The mixture is subsequently placed under vacuum and kept stirred at 50° C. for 1 hour. The vacuum is subsequently broken and 284.46 g of ethyl acetate, 429.88 g of EPS® 74/1 and then 87.43 g of m-XDI are introduced and heating is carried out at 80° C. for 1 hour. After this, 32.87 g of a 75% by weight solution of adduct of XDI and of TMP in ethyl acetate are introduced, followed by 1.10 g of Tyzor Pita®, and the mixture is kept stirred at 80° C. for 2 hours until the hydroxyl functional groups of the polyester diols have completely disappeared.

The degree of progression of the reaction is monitored by measuring the content of NCO group by back titration of dibutylamine using hydrochloric acid, according to the standard NF T52-132.

The reaction is halted by cooling the mixture to 50° C., when the content of NCO group measured is approximately equal to the content of NCO group desired.

7.91 g of Silquest® A1110 are then slowly introduced with vigorous stirring.

Preparation of the —NCO Component of Comparative Example 2

The —NCO component of example 2 is prepared by following the same preparation process as the —NCO component of example 1, in which m-XDI is replaced with IPDI and the solution of adduct of XDI and of TMP is replaced with Vestanat® T1890/100.

Preparation of the —NCO Component of Example 3

The —NCO component of example 3 is prepared by following the same preparation process as the —NCO component of example 1, in which m-XDI is replaced with HMDI.

With regard to the components thus obtained in examples 1, 2 and 3:
- the content of NCO group was measured. This content, measured as % by weight of the —NCO component, was converted into milliequivalents of NCO groups present in 100 g of —NCO component (meq/100 g), and then with respect to 100 g of solids content of the —NCO component,
- the viscosity of the —NCO component obtained was measured 24 hours after its manufacture (D+1) at 23° C.,
- the $r_1$ and $r_2$ ratios were calculated.

All the values obtained are recorded in table 2 below.

1.2. —OH Component

The —OH component is prepared by mixing Dekatol® 1105 and EPS 74/1 in amounts such that the mixture comprises 15% by weight of Dekatol® 1105 and 85% by weight of EPS 74/1, with respect to the weight of the mixture. The —OH component prepared has a solids content of approximately 69%.

The content of OH group in the —OH component, expressed in milligrams of KOH per gram of —OH component (mg KOH/g), is converted into milliequivalents of OH groups present in 100 g of —OH component (meq OH/100 g), and then with respect to 100 g of solids content of the —OH component (see table 2 below).

1.3. Preparation of the Adhesive Composition (or Adhesive Mixture)

The —NCO component prepared in section 1.1 and the —OH component prepared in section 1.2 are mixed, in view of their respective contents of NCO group and OH group, according to a given ratio by weight which makes it possible to achieve a given NCO/OH molar ratio ($r_3$). These ratios are shown in table 2.

The mixing is carried out at ambient temperature via a mixing unit and a static mixer and then the mixture is introduced between the lamination metering rolls described in point 1.4 below, in order to be applied at this temperature.

1.4. Preparation of the Multilayer Structures A and B

The mixture obtained in section 1.3 is used in the manufacture:
- of a bilayer structure A (denoted OPA15/CPP70), the first layer of which consists of a film of oriented polyamide (OPA) with a thickness of 15 µm and the second layer of which consists of a film of cast polypropylene (denoted CPP) with a thickness of 70 µm; and
- of a trilayer structure B (denoted (PET12-A17)/CPP70), the first layer of which consists of a film of PET with a thickness of 12 µm, the second layer of which consists of a sheet of aluminum with a thickness of 7 µm and the third layer of which consists of a film of CPP with a thickness of 70 µm.

Use is made, for this, of a lamination device of Nordmeccanica type provided with a coating device of roll type operating at a temperature of 50° C. and at a rate of forward progression of 50 meters per minute.

In order to prepare the bilayer structure, the adhesive composition consisting of the mixture to be tested is applied between each of the individual layers of material in a layer having a thickness of approximately 4 µm, corresponding to an application of approximately 4 grams of adhesive per square meter of film.

In order to prepare the trilayer structure, the adhesive composition consisting of the mixture to be tested is applied between the sheet of aluminum and the film of CPP in a layer having a thickness of approximately 4 µm, corresponding to an application of approximately 4 grams of adhesive per square meter of film. The film of PET and the sheet of aluminum are adhesively bonded using the same laminating device by applying a layer of standard polyurethane LG 59 adhesive, sold by Bostik, in a proportion of 4 grams of adhesive per square meter, corresponding to a thickness of approximately 4 µm.

1.5. Measurement of the Cohesion and Evaluation of the Degree of Crosslinking of the Multilayer Structures A and B at Ambient Temperature (23° C.) Before Sterilization A first test specimen of the multilayer structure is left to crosslink in a climate-controlled chamber maintained at a temperature of 23° C. and a relative humidity of 50% for 4 days and is subjected to the 180° peel test described below.

A second test specimen of the multilayer structure is left under the same conditions for 7 days and is subjected to the same 180° peel test.

The peel measurements, carried out at D+4 and D+7, that is to say 4 days and 7 days after the manufacture of the multilayer structure, make it possible to monitor the rise in cohesion of the adhesive mixture over time.

In addition, after having carried out the peel test, the presence or absence of tack was evaluated by exerting a gentle pressure of the index finger on the surface of the layer of adhesive left visible after separation of the layers of material. The presence of tack generally indicates that the adhesive has not completely crosslinked.

Description of the 180° Peel Test of a Bilayer Structure

The cohesion of the laminate is evaluated by the 180° peel test as described in the French standard NF T 54-122. The principle of this test consists of the determination of the force necessary for the separation (or peeling) of two individual layers of material bonded by the adhesive to be tested A test specimen of rectangular shape with a width of 15 mm and with a length of approximately 10 cm is cut out from the laminate. The two individual layers of material included in this strip are manually detached from the end of this test specimen, and over approximately 2 cm, and the two free ends thus obtained are attached to two holding devices respectively connected to a stationary part and a movable part of a tensile testing device which are located on a vertical axis.

While a drive mechanism imparts a uniform rate of 100 mm/minute to the movable part, resulting in the detachment of the two layers, the detached ends of which gradually move along a vertical axis with the formation of an angle of 180°, the stationary part-connected to a dynamometer-measures the force withstood by the test specimen thus held, which force is measured in newtons.

Generally, it is considered that the level of cohesion of the layer of an adhesive is sufficient for the multilayer structure to be able to withstand the various operations necessary for its transformation into flexible packaging when the value obtained in the 180° peel test on the laminate is greater than or equal to 5 newtons (N).

Description of the 180° Peel Test of a Trilayer Structure

The cohesion of the laminate is evaluated in the same way as for a bilayer structure at the interface between the layer of CPP and the composite layer consisting of the individual layers of aluminum (Al) and of PET. The force necessary for the separation (or peeling) of the layer of CPP and of the aluminum-PET layer is measured.

Results

It was observed that the adhesive composition of example 1 crosslinks more rapidly than the adhesive composition of example 2. This is because, after a residence of 4 days in a climate-controlled chamber maintained at a temperature of 23° C. and a relative humidity of 50%, the adhesive composition of example 1 had reached a sufficient degree of crosslinking to confer, on the multilayer structure, the level of cohesion necessary to be able to be transformed into flexible packaging, contrary to the adhesive composition of example 2.

This is because the peeling of the laminates A and B obtained from the adhesive composition of example 1 required the exertion of a peel force of greater than 5 newtons from D+4 and led to the tearing of one of the layers of material of the laminate (OPA or aluminum).

Good results were also obtained with the adhesive composition of example 3.

On the other hand, it was observed that the laminates A and B obtained from the adhesive composition of example 2, subjected to the peel test at D+4, delaminate at the adhesive layer and exhibit tack on the surface of the adhesive layer left visible after separation of the layers of material of the laminate.

1.6. Resistance to the Sterilization of the Multilayer Structure A and B

The multilayer structure obtained in section 1.4 is placed in an autoclave at 130° C. in the vapor phase for one hour under 3 bar, in order to sterilize it, and a 180° peel test is carried out 1 hour after removing from the oven.

It is considered that the multilayer structure exhibits a satisfactory resistance to the sterilization when the level of cohesion measured before sterilization on the completely crosslinked adhesive and after sterilization is substantially equal. In particular, this is reflected by a difference in the value obtained in the 180° peel test after sterilization of less than or equal to 30% from the value measured before sterilization.

It was observed, for all the adhesive compositions tested, that the laminates A exhibit a satisfactory resistance to the sterilization but that only the adhesive compositions of examples 1 and 3 according to the invention make it possible to obtain a laminate B which satisfies the sterilization test.

Thus, the different tests carried out have made it possible to demonstrate that only the multilayer structures resulting from the adhesive compositions of examples 1 and 3 exhibit all the properties required in order to rapidly manufacture sterilizable flexible packagings.

TABLE 1

|  |  | Ex. 1 (invention) | Ex. 2 (comparative) | Ex. 3 |
|---|---|---|---|---|
| —NCO Component | m-XDI (44.7% NCO) | 7.95 | — | — |
|  | IPDI (37.6% NCO) | — | 8.73 | — |
|  | Hydrogenated MDI (HMDI) (31.8% NCO) | — | — | 10.22 |

TABLE 1-continued

|  | Ex. 1 (invention) | Ex. 2 (comparative) | Ex. 3 |
|---|---|---|---|
| Polyester diol (OHN = 85 mg KOH/g) | 23.30 | 22.91 | 22.15 |
| Polyester diol (OHN = 34.9 mg KOH/g) | 24.62 | 24.20 | 23.40 |
| Reaction catalyst based on titanium ethyl acetoacetate | 0.10 | 0.10 | 0 |
| Adduct of m-XDI and of trimethylolpropane (15.3% NCO) | 2.24 | — | 3.84 |
| IPDI triisocyanate isocyanurate (17.3% NCO) | — | 3.28 | — |
| Ethyl acetate | 41.07 | 40.07 | 39.71 |
| Adhesion promoter of (3-aminopropyl)trimethoxysilane type | 0.72 | 0.71 | 0.68 |
| Total of the ingredients of the —NCO component | 100 | 100 | 100 |

TABLE 2

| | | Ex. 1 (invention) | Ex. 2 (comparative) | Ex. 3 |
|---|---|---|---|---|
| —NCO Component | NCO/OH molar ratio ($r_1$) | 1.7 | 1.6 | 1.6 |
| | NCO diisocyanate/NCO triisocyanate molar ratio ($r_2$) | 10.3 | 5.8 | — |
| | Content of —NCO group in the solids content of the —NCO component (meq NCO/100 g) | 71.6 | 69.9 | 93.9 |
| | Viscosity at 23° C. at D + 1 (mPa · s) | 914 | 700 | 493 |
| —OH Component | Content of —OH group in the solids content of the —OH component (meq OH/100 g) | 86.6 | 86.6 | 86.6 |
| Mixture of the —NCO and —OH components | Ratio by weight of the —NCO component/of the —OH component | 100/7 | 100/10 | 100/10 |
| | Ratio by weight of solids content of the —NCO component/of the solids content of the —OH component | 100/8.2 | 100/11.5 | 100/11.4 |
| | NCO/OH molar ratio ($r_3$) | 10.1 | 7.1 | 9.5 |

TABLE 3

| | | Ex. 1 (invention) | | Ex. 2 (comparative) | | Ex. 3 (invention) | |
|---|---|---|---|---|---|---|---|
| Grammage (g/m²) | | 3.7 | | 4 | | 3.8 | |
| Multilayer structure | | A | B | A | B | A | B |
| Peel force before pasteurization (N/15 mm) | D + 4 | 6.56 | 5.34 | 4.67 | 3.96 | 6.18 | 5.17 |
| | D + 7 | 7.4 | 5.56 | 5.48 | 4.26 | 7.06 | 5.52 |
| Resistance to the sterilization | | Yes | Yes | Yes | No | Yes | Yes |

The invention claimed is:

1. A two-component polyurethane-based adhesive composition comprising an —NCO component and an —OH component, wherein:
the —NCO component is a composition comprising:
A) at least one polyurethane prepolymer comprising at least two NCO end groups obtained by a polyaddition reaction:
of at least one aliphatic polyisocyanate selected from the group consisting of aliphatic diisocyanate monomer(s) and mixtures of the at least one aliphatic diisocyanate monomer(s) with at least one triisocyanate based on XDI,
of at least one polyester diol,
B) at least one triisocyanate based on XDI, and
C) at least one organic solvent in an amount ranging from 5% to 55% by weight, and
the —OH component is a composition comprising at least one polyester polyol, wherein the at least one triisocyanate based on XDI is selected from the group consisting of XDI isocyanurates, XDI biurets, adducts of XDI and of triols, and their mixtures, wherein the molar ratio of the number of NCO groups present in the total amount of the aliphatic diisocyanate monomer(s) used to synthesize the at least one polyurethane prepolymer to the number of OH groups present in the total amount of the at least one polyester diol used to synthesize the at least one polyurethane prepolymer, denoted $r_1$, ranges from 1.0 to 2.2, and wherein the at least one polyester diol and the at least one polyester polyol exhibits a hydroxyl number (OHN) ranging from 28 to 112 mg KOH/g.

2. The two-component polyurethane-based adhesive composition as claimed in claim 1, wherein the aliphatic diisocyanate monomer(s) is (are) selected from the group consisting of:
xylylene diisocyanate (XDI),
aliphatic diisocyanate monomers other than XDI, and
mixtures of aliphatic diisocyanate monomers other than XDI and of XDI comprising at least 50% by weight of XDI, with respect to the weight of said mixtures.

3. The two-component polyurethane-based adhesive composition as claimed in claim 1, wherein the aliphatic diisocyanate monomer(s) is (are) selected from the group consisting of:
Hexamethylene diisocyanate (HDI),
Heptane diisocyanate,
Octane diisocyanate,
Nonane diisocyanate,
Decane diisocyanate,
Undecane diisocyanate,
Dodecane diisocyanate,
HDI allophanate,
Methylenebis(4-cyclohexyl isocyanate) (HMDI),
Isophorone diisocyanate (IPDI),
Norbornane diisocyanate,
Norbornene diisocyanate,
1,4-Cyclohexane diisocyanate (CHDI),
Methylcyclohexane diisocyanate,
Ethylcyclohexane diisocyanate,
Propylcyclohexane diisocyanate,
Methyldiethylcyclohexane diisocyanate,
Cyclohexanedimethylene diisocyanate,
1,5-Diisocyanato-2-methylpentane (MPDI),
1,6-Diisocyanato-2,4,4-trimethylhexane,
1,6-Diisocyanato-2,2,4-trimethylhexane (TMDI),
4-Isocyanatomethyl-1,8-octane diisocyanate (TIN),
2,5-Bis(isocyanatomethyl)bicyclo[2.2.1]heptane (2,5-NBDI),
2,6-Bis(isocyanatomethyl)bicyclo[2.2.1]heptane (2,6-NBDI),
1,3-Bis(isocyanatomethyl)cyclohexane (1,3-H6-XDI),
1,4-Bis(isocyanatomethyl)cyclohexane (1,4-H6-XDI),
Xylylene diisocyanate;
and their mixtures.

4. The two-component polyurethane-based adhesive composition as claimed in claim 1, wherein the aliphatic diisocyanate monomer(s) comprises XDI or methylenebis(4-cyclohexyl isocyanate) (HMDI).

5. The two-component polyurethane-based adhesive composition as claimed in claim 1, wherein the molar ratio of the number of NCO groups present in the total amount of the aliphatic diisocyanate monomer(s) used to synthesize the at least one polyurethane prepolymer to the number of NCO groups present in the total amount of the at least one triisocyanate based on XDI, denoted $r_2$, ranges from 3 to 11.

6. The two-component polyurethane-based adhesive composition as claimed in claim 1, wherein the —OH component is the composition comprising a polyester diol or a mixture of polyester diols.

7. The two-component polyurethane-based adhesive composition as claimed in claim 1, wherein the content of NCO groups in the —NCO component ranges from 40 to 125 milliequivalents of NCO groups per 100 grams of solids content of the —NCO component.

8. The two-component polyurethane-based adhesive composition as claimed in claim 1, wherein the content of OH groups ranges from 70 to 100 milliequivalents of OH groups per 100 grams of solids content of the —OH component.

9. The two-component polyurethane-based adhesive composition as claimed in claim 1, wherein the —NCO component and the —OH component, which are intended to be mixed, are in amounts such that the molar ratio of the number of NCO groups present in the total amount of the —NCO component to the number of OH groups present in the total amount of the —OH component, denoted $r_3$, ranges from 2 to 15.

10. A multilayer structure comprising at least two layers of material bonded together by an adhesive layer, wherein said adhesive layer comprises the two-component polyurethane-based adhesive composition as defined in claim 1, obtained by mixing the —NCO component and the —OH component in the crosslinked state.

11. The multilayer structure as claimed in claim 10, comprising at least one layer of aluminum-based material.

12. A process for manufacturing of the multilayer structure as defined in claim 10, comprising the following stages:
    (i) mixing the —NCO component and the —OH component to form a mixture, then
    (ii) coating said mixture over a surface of a first layer of material to form a coated surface, then
    (iii) laminating a surface of a second layer of material over said coated surface, then
    (iv) crosslinking said mixture.

13. The process as claimed in claim 12, wherein the mixing of the —NCO component and of the —OH component comprises at least one solvent and in which the process additionally comprises a stage of evaporation of the at least one solvent.

* * * * *